F. R. Grumel.
Photographic Album.
Nº 1,283.    Patented May 14, 1861.
32,287.
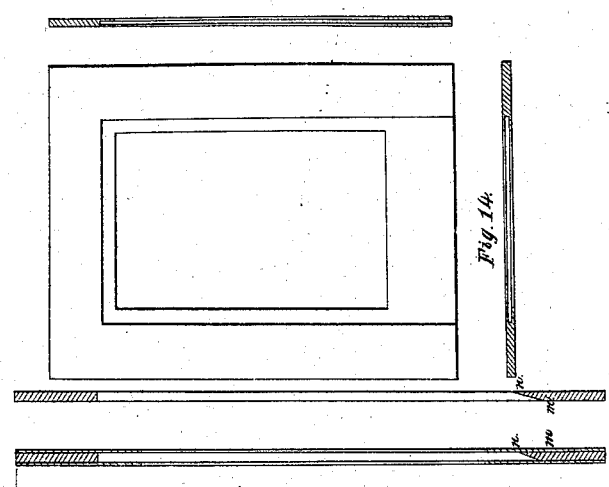

UNITED STATES PATENT OFFICE.

F. R. GRUMEL, OF GENEVA, SWITZERLAND.

PHOTOGRAPHIC ALBUM.

Specification of Letters Patent No. 32,287, dated May 14, 1861.

*To all whom it may concern:*

Be it known that I, F. R. GRUMEL, of Geneva, in the Republic of Switzerland, have invented new and useful Improvements in the Construction and Arrangement of Leaves for Albums for Collection of Photographic and Lithographic Proofs, Engravings, or other Drawings; and I do hereby declare the following to be a full, clear, and exact description thereof, reference being had to the accompanying drawing, in which the several figures represent elevations and sectional views of my said improvements.

My invention relates to the production of albums destined to contain collection of photographic proofs or of other drawings and consists, 1st, in the construction of leaves for albums for collection of photographic or lithographic proofs, engravings or other drawings with an opening or frame on each side, so that two proofs, engravings, or drawings may be inserted back to back, thereby showing one on either side substantially as hereinafter shown and described. 2nd, in the formation of leaves for photographic or other albums by combining with a front and back framing leaf, a center leaf recessed and of such thickness as that when containing one or two photographic cards, they shall be flush with the general surface of the leaf as hereinafter specified. 3rd, in the construction of leaves for photographic or other albums by pasting or otherwise permanently fixing the front and back framing leaf on to the center leaf on 3 sides thereof leaving one side open and free for the insertion of photographic cards or drawings as hereinafter described. 4th, in combining with leaves constructed and arranged as hereinafter described, the filling piece for closing the gap formed, for the ready insertion of the photographic cards, between the framing leaves, substantially as hereinafter set forth.

In the accompanying drawing A represents an album composed of leaves constructed according to my invention.

Figure 1 is an elevation of the leaf complete ready to receive within the thickness of the center leaf the photographic cards placed back to back. Fig. 2 is an elevation of the leaf with the framing leaf removed, and Figs. 3 and 4 are sectional views respectively through the lines 1—2 and 3—4.

From these figures it will be seen that each leaf is composed of 3 leaves pasted together, the central one being of a thickness equal to that of two photographic cards—and recessed or having cut out a quadrangle A, B, C, D, equal in length and breadth to the size of said cards—the outer leaves have similar quadrangles E, F, G, H, cut out at or about their centers, but are somewhat smaller in both dimensions so as to overlap the edges of the recess in the center leaf. It is obvious that the open space in the center leaves instead of being quadrangular may be oval or of any other convenient or pleasing form. The 3 leaves are thus pasted together on all sides with the exception of one marked A, D, I, J, which forms the slot through which the cards are inserted. The leaves thus constructed may be bound together to form a volume or book in the following manner; I paste or glue a linen strip *a*, *b*, *c*, see Fig. 6, against the edge joining the back of the book of two paper leaves L M forming the verso and recto of two adjacent album-leaves. I then paste the board or center leaf N against one of the faces of the paper leaf M as shown in Fig. 7; a second board P is pasted onto the paper leaf L; the album leaf thus completed is seen in Fig. 8. The operation is repeated by pasting against the raw side of the board another paper leaf which is previously prepared with a linen strip as above referred to, and so on till the requisite thickness of the volume is obtained (see Fig. 10).

The edge of the interior quadrangle of the board that corresponds with the side at which the cards are inserted I prefer to bevel off in order to facilitate the removal of the cards when necessary.

Figs. 12, 13 and 14 represent a modification of my improvement and which consists in cutting out in one side of the center leaf or board a portion which corresponds to the width or length (as the case may be) of the photographic card to be inserted and which is used to fill up the gap between the two framing leaves. By this arrangement it will be seen that the album presents a neat finish and when closed will prevent dust or air from penetrating whereby photographic pictures particularly are liable to be defaced.

Having thus described my invention, I claim;

1. The construction of leaves for album for collection of photographic or lithographic proofs, engravings or other drawings, with an opening or frame on each side so that two proofs, engravings or drawings may be inserted back to back, thereby showing one on either side substantially as shown and described.

2. The formation of leaves for photographic or other album by combining with a front and back framing leaf a center leaf recessed and of such thickness as that when containing one or two photographic cards, they shall be flush with the general surface of the leaf as herein specified.

3. The construction of leaves for photographic or other album by pasting or otherwise permanently fixing the front and back framing leaf onto the center leaf on 3 sides thereof—leaving one side open and free for the insertion of photographic cards or drawings as described.

4. In combination with leaves constructed and arranged as herein described, the filling piece for closing the gap formed for the ready insertion of the photographic cards between the framing leaves substantially as herein specified.

In testimony whereof I have signed my name to this specification before two subscribing witnesses.

F. R. GRUMEL.

Witnesses:
 THOS. AMOUROUS,
 GEO. HUTTON.